US012718059B2

(12) United States Patent
Wong et al.

(10) Patent No.: US 12,718,059 B2
(45) Date of Patent: Aug. 25, 2026

(54) SIAMESE NEURAL NETWORK MODEL FOR LINKING INCIDENT MANAGEMENT TICKETS

(71) Applicant: Microsoft Technology Licensing, LLC, Redmond, WA (US)

(72) Inventors: Jimmy Chi Kin Wong, Arlington, VA (US); Rakesh J. Namineni, Sammamish, WA (US); Mohit Verma, Seattle, WA (US); Udayan Kumar, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1117 days.

(21) Appl. No.: 17/552,110

(22) Filed: Dec. 15, 2021

(65) Prior Publication Data

US 2023/0186052 A1 Jun. 15, 2023

(51) Int. Cl.
*G06N 3/045* (2023.01)
*G06F 40/284* (2020.01)
*G06N 3/08* (2023.01)

(52) U.S. Cl.
CPC .......... *G06N 3/045* (2023.01); *G06F 40/284* (2020.01); *G06N 3/08* (2013.01)

(58) Field of Classification Search
CPC ......... G06N 3/045; G06N 3/08; G06F 40/284
See application file for complete search history.

(56) References Cited

U.S. PATENT DOCUMENTS 10,825,227 B2 11/2020 Amer et al.
11,061,890 B2 7/2021 Steuer et al.
(Continued)

FOREIGN PATENT DOCUMENTS

CN 107967255 A 4/2018
CN 112465045 A 3/2021

OTHER PUBLICATIONS

Chen, et al., "Identifying Linked Incidents in Large-Scale Online Service Systems", In Proceedings of the 28th ACM Joint Meeting on European Software Engineering Conference and Symposium on the Foundations of Software Engineering, Nov. 8, 2020, pp. 304-314.

(Continued)

*Primary Examiner* — Omar F Fernandez Rivas
*Assistant Examiner* — Shamcy Alghazzy

(57) ABSTRACT

A method for training a neural network for linking incident management tickets is provided. A first training set of linked pairs of incident management tickets is generated. Each pair is labeled as being linked and comprises first and second tickets having first text features and second features. A Siamese neural network model is trained using the first text features as inputs to an input layer of the model. The input layer is configured to generate first and second input embeddings for the first and second tickets, respectively. The model is trained using the first and second input embeddings and the second features as inputs to an output layer of the model. The output layer is configured to generate first and second output embeddings for the first and second tickets, respectively. The model is trained using a contrastive loss function between the first and second output embeddings.

20 Claims, 8 Drawing Sheets

(56) References Cited

U.S. PATENT DOCUMENTS

| | | | | |
|---|---|---|---|---|
| 2016/0099010 | A1* | 4/2016 | Sainath | G10L 15/16 704/232 |
| 2018/0025256 | A1* | 1/2018 | Bai | G06F 18/2415 382/229 |
| 2018/0173495 | A1* | 6/2018 | Podder | G06N 3/044 |
| 2019/0147602 | A1* | 5/2019 | Tao | G06V 10/809 382/103 |
| 2019/0164245 | A1 | 5/2019 | Takacs | |
| 2020/0143247 | A1* | 5/2020 | Jonnalagadda | G06N 3/044 |
| 2020/0160869 | A1* | 5/2020 | Heigold | G10L 17/04 |
| 2020/0242623 | A1 | 7/2020 | Savir et al. | |
| 2020/0334809 | A1* | 10/2020 | Vianu | G06V 30/1916 |
| 2021/0192298 | A1* | 6/2021 | van den Oord | G06N 3/08 |
| 2021/0328888 | A1 | 10/2021 | Rath | |
| 2021/0357378 | A1* | 11/2021 | Urdiales | G06N 3/08 |
| 2022/0156489 | A1* | 5/2022 | Agarwal | G06F 40/106 |
| 2023/0161661 | A1* | 5/2023 | Higgins | G06F 11/0772 714/37 |

OTHER PUBLICATIONS

Liao, et al., “Detecting Duplicate Questions in Stack Overflow via Semantic and Relevance Approaches”, In Proceedings of 28th Asia-Pacific Software Engineering Conference, Dec. 7, 2021, pp. 111-119.

“International Search Report and Written Opinion Issued in PCT Application No. PCT/US22/042972”, Mailed Date: Nov. 21, 2022, 15 Pages.

* cited by examiner

SIAMESE NEURAL NETWORK MODEL FOR LINKING INCIDENT MANAGEMENT TICKETS

BACKGROUND

Disruption of computer systems, particularly those that support cloud computing or e-Commerce applications, may cause substantial losses in proprietary data, revenue, and customer satisfaction. Incidents may be detected in several locations (e.g., different computer networks, routers, or other equipment) and then flagged for review to identify a cause and/or solution for a problem. For example, tickets may be generated by various computing devices or network management personnel and open tickets may then be reviewed by on-call engineers or site reliability engineers. However, management of tickets becomes challenging when the computing devices are spread out across a large geographical area and encompass many different business groups or sub-groups, at least due to a number of tickets that may be generated, their frequency of generation, etc. Although a trained and experienced engineer may be able to discern when several tickets are related to each other and more easily diagnose a problem, sifting through large numbers of tickets still requires a large pool of engineers for managing cloud or distributed computing systems.

It is with respect to these and other general considerations that aspects of the present disclosure have been described. Also, although relatively specific problems have been discussed, it should be understood that the disclosed aspects should not be limited to solving the specific problems identified in the background.

SUMMARY

Aspects of the present disclosure are directed to linking incident management tickets.

In one aspect, a method for training a neural network for linking incident management tickets is provided. A first training set of linked pairs of incident management tickets is generated, where each linked pair of the first training set is labeled as being linked and comprises: a first ticket having a first text feature and a second feature, and a second ticket having a first text feature and a second feature. A Siamese neural network model is trained using the first text feature of the first ticket and the first text feature of the second ticket as inputs to an input layer of the Siamese neural network model. The input layer is 410897-US-NP configured to generate first input embeddings for the first ticket and second input embeddings for the second ticket. The Siamese neural network model is trained using the first input embeddings, the second input embeddings, the second feature of the first ticket, and the second feature of the second ticket as inputs to an output layer of the Siamese neural network model. The output layer is configured to generate first output embeddings for the first ticket and second output embeddings for the second ticket. The Siamese neural network model is trained using a contrastive loss function between the first output embeddings for the first ticket and the second output embeddings for the second ticket.

In another aspect, a method for generating link information is provided. A plurality of incident management tickets are received. Each of the plurality of incident management tickets has a first text feature and a second feature. Pairs of tickets within the plurality of incident management tickets that are linked are identified, comprising: selecting a first candidate ticket and a second candidate ticket from the plurality of incident management tickets; providing the first text feature of the first candidate ticket and the first text feature of the second candidate ticket to an input layer of a Siamese neural network model, the input layer being configured to generate first input embeddings for the first candidate ticket and second input embeddings for the second candidate ticket; providing the second feature of the first candidate ticket and the second feature of the second candidate ticket to an output layer of the Siamese neural network model, the output layer being configured to generate first output embeddings for the first candidate ticket and second output embeddings for the second candidate ticket; determining a distance metric between the first output embeddings and the second output embeddings; and identifying the first candidate ticket and the second candidate ticket as being linked when the distance metric meets a linking threshold.

In yet another aspect, a system for training a neural network for linking incident management tickets is provided. The system includes an incident processor configured to receive incident management tickets. The incident processor is configured to generate a first training set of linked pairs of incident management tickets, wherein each linked pair of the first training set is labeled as being linked and comprises: a first ticket having a first text feature and a second feature, and a second ticket having a first text feature and a second feature. The incident processor is further configured to: train a Siamese neural network model using the first text feature of the first ticket and the first text feature of the second ticket as inputs to an input layer of the Siamese neural network model, the input layer being configured to generate first input embeddings for the first ticket and second input embeddings for the second ticket; train the Siamese neural network model using the first input embeddings, the second input embeddings, the second feature of the first ticket, and the second feature of the second ticket as inputs to an output layer of the Siamese neural network model, the output layer being configured to generate first output embeddings for the first ticket and second output embeddings for the second ticket; and train the Siamese neural network model using a contrastive loss function between the first output embeddings for the first ticket and the second output embeddings for the second ticket.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific descriptions, figures, or examples. These aspects may be combined, other aspects may be utilized, and structural changes may be made without departing from the present disclosure. Aspects of the present disclosure may be practiced as methods, systems, or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Identification of related tickets for incident management may be performed by an incident processor on a computing device, instead of an experienced engineer. In order to improve performance, care may be taken in configuring the incident processor to avoid giving an unacceptable number of false positives, where tickets are flagged as being related when they are not, because this situation leads to a loss of confidence in the incident processor. In examples described herein, a Siamese neural network model is utilized by an incident processor to predict whether pairs or groups of tickets are linked to one another. Advantageously, the incident processor is configured to process tickets across a wide range of groups within an organizational hierarchy, improving the likelihood of detecting and/or diagnosing a system-wide issues, instead of being limited to local issues. The incident processor may also be configured to train the Siamese neural network model using negative samples: samples that might appear to be related, but have been determined to be unrelated. In some examples, the Siamese neural network model includes two or more neural networks in series for processing different portions of data from the tickets.

Figure 1:
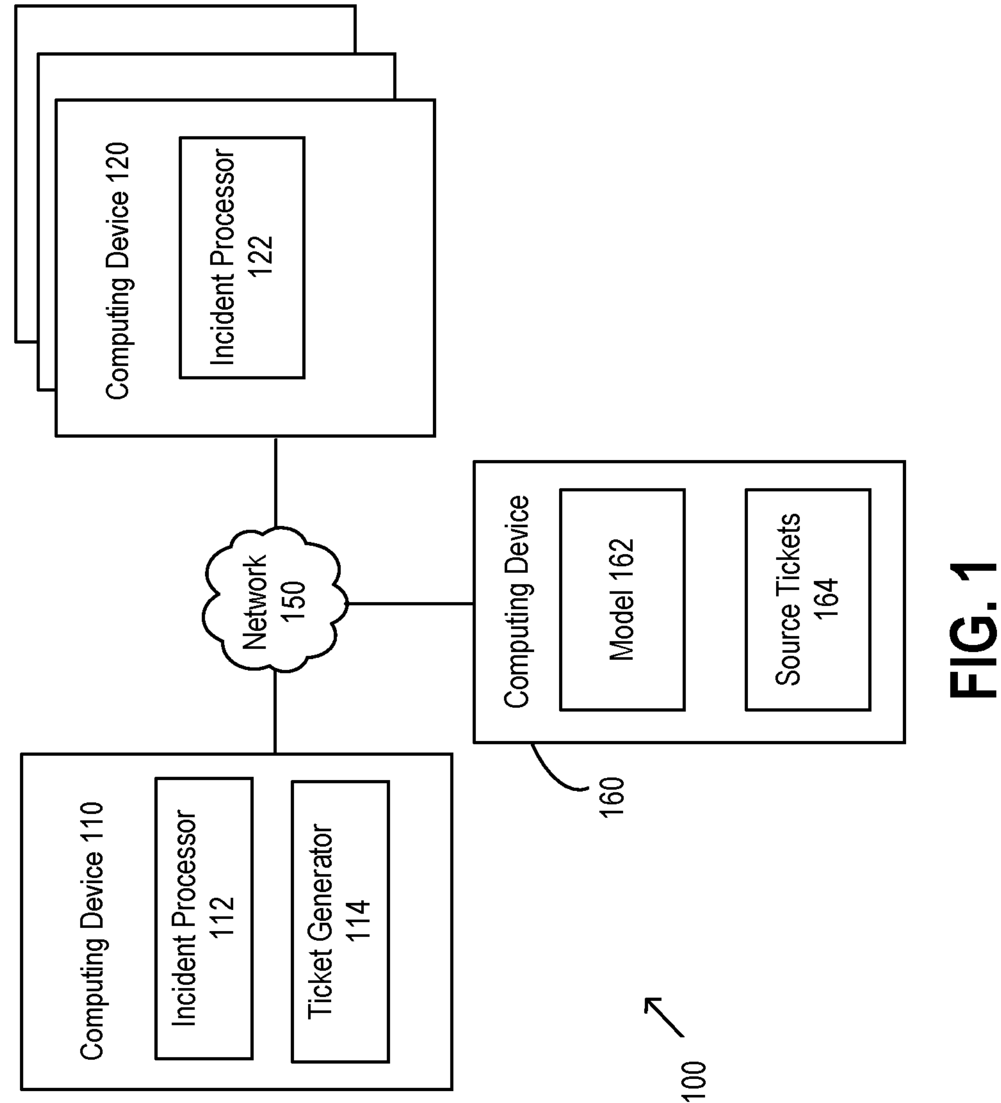
FIG. 1 shows a block diagram of an example of an incident processing system that is configured to generate link information, according to an example aspect of the disclosure.

In accordance with aspects of the present disclosure, FIG. 1 depicts an example of an incident processing system 100 that is configured to generate link information. The incident processing system 100 includes a computing device 110 and a computing device 120. In some examples, the incident processing system 100 also includes a data store 160. A network 150 communicatively couples computing device 110, computing device 120, and data store 160. The network 150 may comprise one or more networks such as local area networks (LANs), wide area networks (WANs), enterprise networks, the Internet, etc., and may include one or more of wired, wireless, and/or optical portions.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). Computing device 110 may be configured to execute one or more software applications (or "applications") and/or services and/or manage hardware resources (e.g., processors, memory, etc.), which may be utilized by users (e.g., customers) of the computing device 120. The computing device 120 may include one or more server devices, distributed computing platforms, cloud platform devices, and/or other computing devices. For ease of discussion, the description herein refers to a single computing device 120, but features and examples of the computing device 120 are applicable to two, three, or more computing devices 120.

The computing device 110 includes an incident processor 112 that receives tickets for incident management and processes the tickets to identify related tickets. In various examples, related tickets have relationships such as a pair or group of tickets that are duplicates of each other, one or more first tickets that are responsible for one or more second tickets, or one or more tickets that are related to one or more second tickets. In some examples, a first ticket is responsible for two or more tickets that are duplicates of each other. In other examples, related tickets have different combinations of relationships. In some examples, the incident processor 112 flags tickets as being Duplicates, Responsible, and/or Related to other tickets.

The computing device 110 may also include a ticket generator 114, in some examples, as described below. In some scenarios, the incident processor 112 flags tickets that are related so that they may be more easily reviewed by an engineer or other user. For example, the incident processor 112 may insert a link and/or reference from one ticket to another ticket when those tickets are related. In some examples, the links are bidirectional so that either ticket links to the other ticket. In examples, the incident processor 112 generates link information that defines or identifies the links between the related tickets, for example, by providing a parent ticket ID, a child ticket ID, and/or relationship type identifier (e.g., duplicate, responsible, related). In an aspect, the incident processor 112 is configured to utilize a neural network model, such as a neural network model 162, described below. The computing device 120 includes an incident processor 122, which may be the same, or similar to, the incident processor 112.

In accordance with examples of the present disclosure, the incident processor 112 may receive two or more tickets and provide them to a neural network model executing at a neural processing unit. The neural network model may output link information for the tickets, as described below. Because the neural processing unit is specifically designed and/or programmed to process neural network tasks, the consumption of resources, such as power and/or computing cycles, is less than the consumption would be if a central processing unit were used.

The data store 160 is configured to store data, for example, the neural network model 162 and source tickets 164. In various aspects, the data store 160 is a network server, cloud server, network attached storage ("NAS") device, or other suitable computing device. Data store 160 may include one or more of any type of storage mechanism, including a magnetic disc (e.g., in a hard disk drive), an optical disc (e.g., in an optical disk drive), a magnetic tape (e.g., in a tape drive), a memory device such as a random access memory (RAM) device, a read-only memory (ROM) device, etc., and/or any other suitable type of storage medium. Although only one instance of the data store 160 is shown in FIG. 1, the incident processing system 100 may include two, three, or more similar instances of the data store 160. Moreover, the network 150 may provide access to other data stores, similar to data store 160 that are located outside of the incident processing system 100, in some examples.

The neural network model 162 is configured to generate link information for tickets that are related to each other. In some scenarios, the neural network model 162 is trained to identify links using the source tickets 164. For example, the source tickets 164 include various groups of two or more tickets that have been labeled as being linked, and the neural network model 162 is trained to identify similar links between tickets. In some aspects, the neural network model 162 is also configured to determine a confidence level of the identified links (e.g., 95% confident). In some examples, the source tickets 164 are omitted from the data store 160, but are stored in another suitable storage (e.g., within an incident management center).

To improve training of the neural network model 162, the source tickets 164 may include negative samples: samples that might appear to be related, but have been determined to be unrelated. The ticket generator 114 of the computing device 110 may be configured to generate data for training the neural network model 162, for example, by generating negative samples. In some examples, the ticket generator 114 stores the negative samples within the source tickets 164. However, in other examples, the ticket generator 114 dynamically generates the negative samples without storing them within the source tickets 164. This approach may substantially reduce an amount of memory needed to train the neural network model 162 by reducing a number of tickets that are stored in memory. Although the ticket generator 114 is shown as part of the computing device 110, the ticket generator 114 may be incorporated into the computing device 120, into the computing device 160, or other suitable computing devices in other examples. In some examples, the ticket generator 114 generates negative samples, such as an unlinked pair of tickets, where each of the pair of tickets is created within a same short-term processing window (e.g., 4-6 hours), is based on established positive weights for link types (e.g., weights that emphasize tickets within a same team, cross team, cross workload, or other commonly linked criteria), and/or based on at least partial matching of title text (e.g., fuzzy matching of at least 20%).

Generally, the source tickets 164 are historical incident management tickets that have been labeled as being either linked or unlinked. In some examples, the source tickets 164 include tickets that have been partially or entirely generated by a user or pseudo-random ticket generator (not shown), for example, to generate tickets for training that cover specific use cases. The source tickets 164 may include a plurality of text features or text strings, such as a title, a team name (e.g., a team of engineers where the ticket was assigned), a monitor ID (e.g., an ID of a monitoring device that generated the ticket), failure type monitor (e.g., an indication of a failure mode of the monitoring device), and a region (e.g., a geographical region where the monitoring device is located). While five text features are described, the tickets (e.g., source tickets 164) may have additional text features (e.g., a user-entered description) and non-text features (e.g., time-stamps, IP addresses, network topology features, Dag, Machine, Forest, Rack, Cluster, or other suitable metadata), in various examples.

In some examples, the text features are tokenized and indexed to create embeddings. For example, a vector of ["Exchange", "Forest", "Down", "Exchange"] is tokenized and indexed to [4, 100, 200, 4]. In some examples, the vector is padded to a maximum length, such as [4, 100, 200, 4, 0, . . . 0]. For tokenization, the ticket generator 114 creates a word-to-integer index dictionary for each text feature of the plurality of text features.

Figure 2:
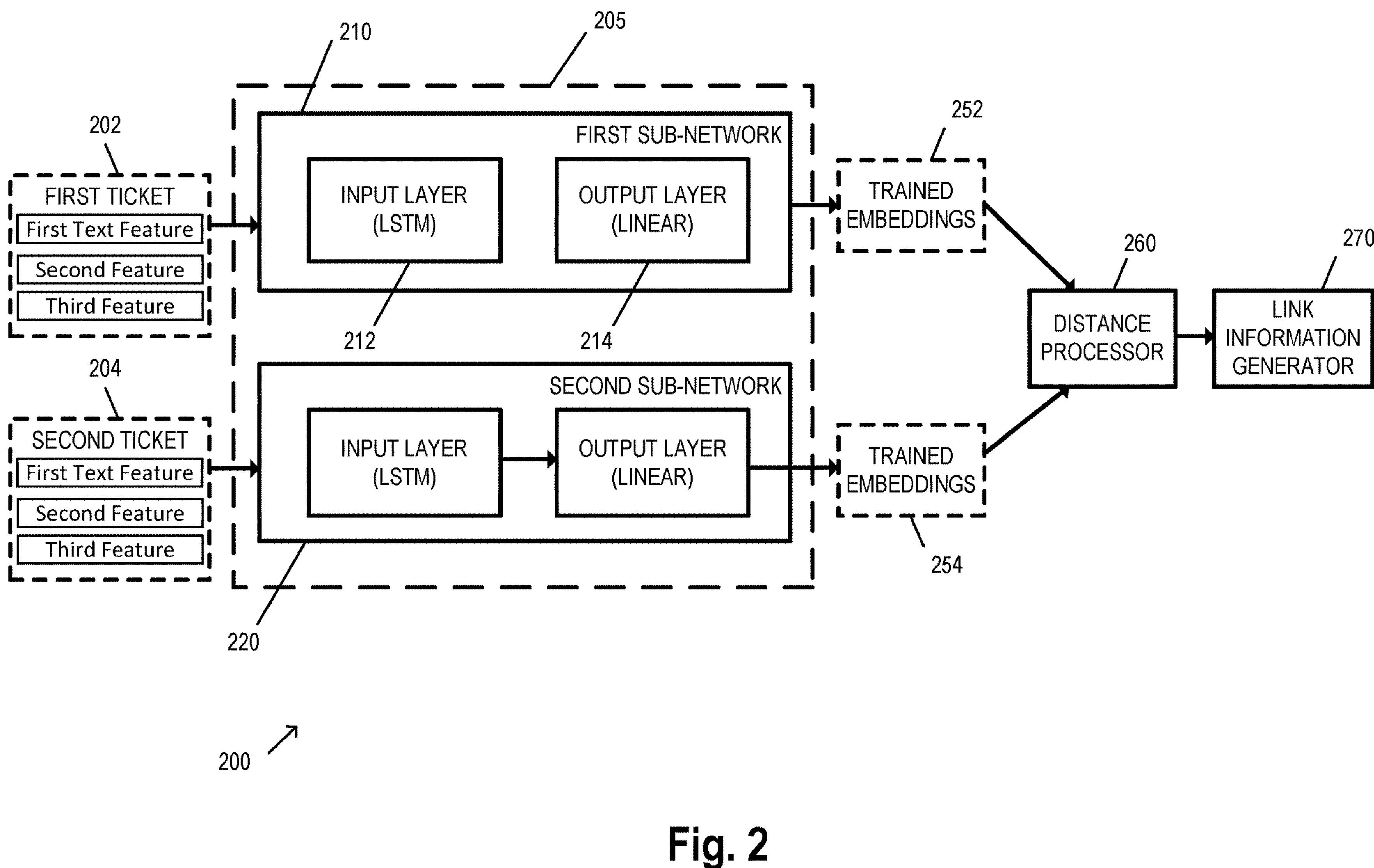
FIG. 2 shows a block diagram of an example of an incident processor for linking incident management tickets.

FIG. 2 depicts an example of an incident processor 200 for linking incident management tickets, according to an aspect of the disclosure. The incident processor 200 generally corresponds to the incident processor 112 and/or 122, in some examples. The incident processor 200 includes a Siamese neural network model 205 that is configured to process pairs of tickets, such as ticket 202 and ticket 204, to generate respective trained embeddings 252 (corresponding to ticket 202) and 254 (corresponding to ticket 204).

The incident processor 200 further includes a distance processor 260 and a link information generator 270. The distance processor 260 is configured to determine a confidence value for similarity between the trained embeddings 252 and 254. For example, the distance processor 260 may determine a relatively high confidence value (e.g., 0.98) when the trained embeddings 252 and 254 are very similar and relatively low confidence value (e.g., 0.2) when the trained embeddings 252 and 254 are not similar. Generally, a high confidence value above a predetermined threshold (e.g., 0.7 or more) indicates that the tickets 202 and 204 are linked (or should be linked). The distance processor 260 is configured to calculate a squared Euclidean distance between the trained embeddings 252 and 254, in some examples. In other examples, the distance processor 260 determines a different distance metric for comparing the trained embeddings 252 and 254, for example, a Manhattan distance, a Minkowski distance, or Hamming distance.

The link information generator 270 generates suitable link information, for example, when the confidence value meets the predetermined threshold. In some examples, the link information generator 270 modifies the ticket 202 to contain a link or reference to the ticket 204 when the confidence value meets the predetermined threshold. In other examples, the link information generator 270 modifies the ticket 202 to contain a link or reference to the ticket 204 and also modifies the ticket 204 to contain a link or reference to the ticket 202. In some examples, the link information generator 270 utilizes a softmax function or layer for class probabilities (e.g., linked or not linked).

The Siamese neural network model 205 includes a first neural network model 210 (e.g., a first sub-network) and a second neural network model 220 (e.g., a second sub-network) that are identical to each other (e.g., they have a same configuration with same parameters and weights). The first neural network model 210 is arranged as an input layer 212 and an output layer 214 and receives a first ticket (e.g., ticket 202) of a pair that is processed by the Siamese neural network model 205. The second neural network model 220 receives the second ticket (e.g., ticket 204) of the pair. The input layer 212 is configured to process a first text feature of the plurality of text features for a ticket, while the output layer 214 is configured to process an output of the input layer 212 and any remaining text features of the plurality of text features.

In some examples, the input layer 212 is selected to be a long short-term model (LSTM) that processes a title of the ticket. Generally, the long short-term model is selected to emphasize an ordering of words within the title of the ticket. In other examples, an expert layer is selected as the input layer 212. In some examples, input layer 212 is configured as a transformer-based language model using a plurality of encoder layers and a plurality of bidirectional self-attention heads. The output layer 214 is selected to be a different neural network model, such as a linear neural network model. In some examples, the output layer 214 is a sequence of two or more linear neural network models (e.g., implemented as two or more layers). For example, the output layer 214 may include one or more intermediate layers before a final output layer.

In some examples, the Siamese neural network model 205 is trained through contrastive loss to learn relationships between ticket pairs' labels (e.g., related or unrelated) and a plurality of text features. Generally, the trained embeddings 252 and 254 for each ticket pair are used to calculate a Euclidean distance and pairs that are linked have embeddings close in Euclidean distance, while unlinked pairs are farther apart. In other examples, the Siamese neural network model 205 is trained using cosine embedding loss or other suitable loss functions.

Figure 3:
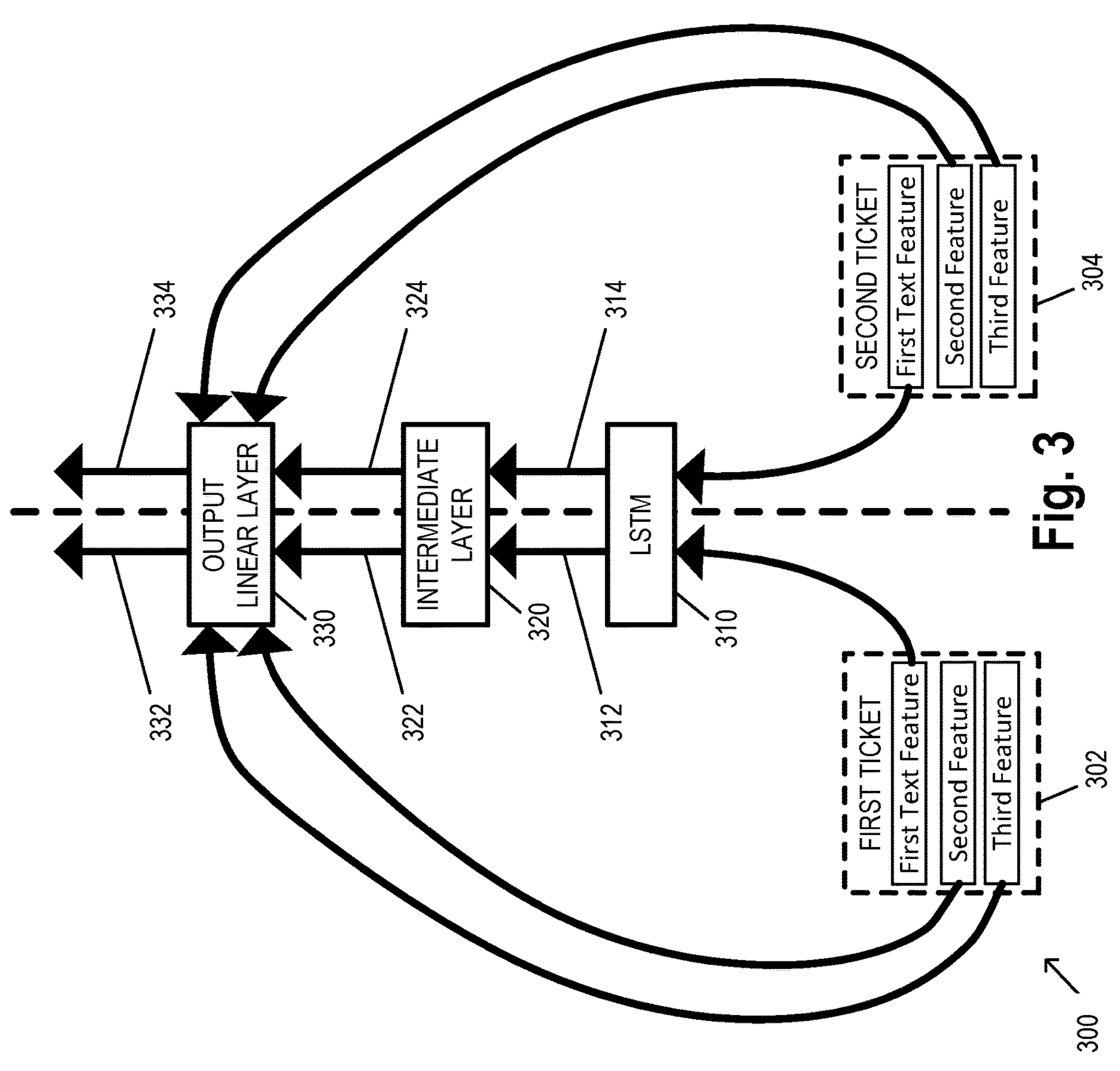
FIG. 3 shows a block diagram of an example of a Siamese neural network model 300 for linking incident management tickets.

FIG. 3 depicts an example of a Siamese neural network model 300 for linking incident management tickets, according to an aspect of the disclosure. The Siamese neural network 300 generally corresponds to the Siamese neural network 200 and illustrates a long short-term layer 310 (as input layer 212), an intermediate linear layer 320 (within the output layer 214), and an output linear layer 330 (within the output layer 214). Although the neural network 300 includes three layers, in other aspects, the neural network 300 includes two, four, five, or more layers. For example, the neural network 300 may include additional intermediate linear layers between the long short-term memory layer 310 and the output layer 330.

Although Siamese neural networks are often used for image analysis, the Siamese neural network model 300 is configured to process text features and generate corresponding embeddings. As a Siamese neural network, the Siamese neural network model 300 as shown in FIG. 3 has left and right sub-networks, analogous to the first neural network model 210 and the second neural network model 220, respectively, where the left sub-network processes a first ticket 302 of a candidate pair and the right sub-network processes a second ticket 304 of the candidate pair. In the example shown in FIG. 3, each of the first ticket 302 and the second ticket 304 include a first text feature, such as a title or subject line, and one or more second features, shown as a second feature and a third feature.

The long short-term layer 310 uses the first text features of the tickets 302 and 304 as inputs and outputs long short-term layer hidden states as a first input embeddings 312 and second input embeddings 314. The intermediate linear layer 320 is configured to condense the first input embeddings 312 into first condensed embeddings 322 and second condensed embeddings 324. The output layer 330 is configured to process the condensed input embeddings 322 and 324 and any remaining features (e.g., second and third features) to produce a first output embedding 332 for the first ticket 302 and a second output embedding 334 for the second ticket 304.

Although not shown in FIG. 3, the Siamese neural network model 300 may include additional processors configured to tokenize, index, and/or flatten one or more of the features of the tickets 302 and 304 (e.g., the first text feature, the second feature, the third feature, etc.), the first input embeddings 312 and the second input embeddings 314, the first condensed embeddings 322 and the second condensed embeddings 324, and/or the first output embedding 332 and the second output embedding 334. For example, the Siamese neural network model 300 may include a processor (e.g., incident processor 122) that reduces a size, length, number of dimensions, or other characteristic of at least some of the features to improve responsiveness of the Siamese neural network model 300 by reducing its complexity, memory requirements, and/or processing requirements.

Figure 4:
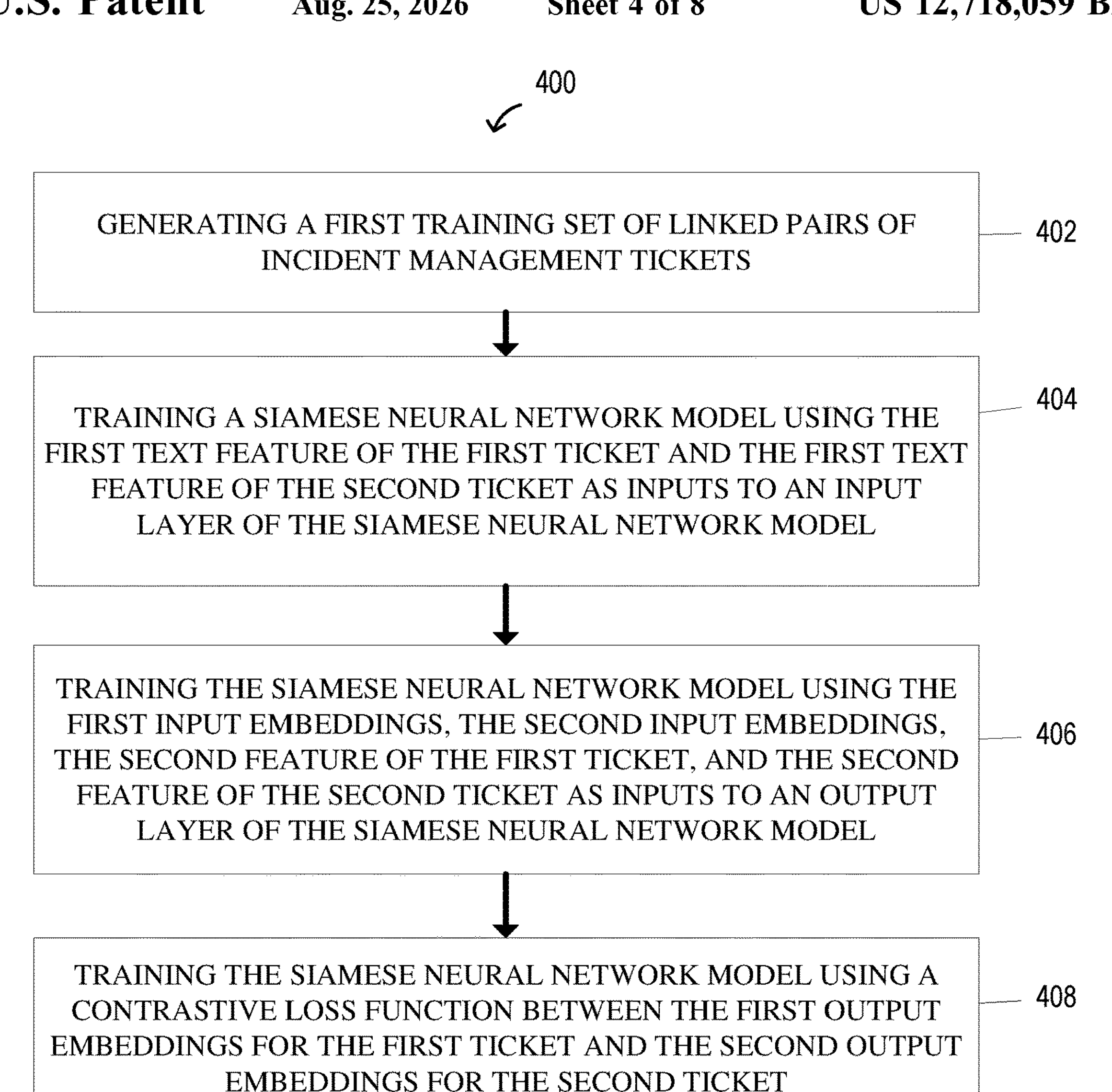
FIG. 4 shows a diagram of an example process flow for training a neural network for linking incident management tickets.

FIG. 4 shows a flowchart of an example method 400 of training a neural network for linking incident management tickets, according to an example. Technical processes shown in these figures will be performed automatically unless otherwise indicated. In any given example, some steps of a process may be repeated, perhaps with different parameters or data to operate on. Steps in an example may also be performed in a different order than the top-to-bottom order that is laid out in FIG. 6. Steps may be performed serially, in a partially overlapping manner, or fully in parallel. Thus, the order in which steps of method 600 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 4 may be performed by the computing device 110 (e.g., via the incident processor 112 and/or ticket generator 114), the server 120 (via the incident processor 122), or other suitable computing device.

Method 400 begins with step 402. At step 402, a first training set of linked pairs of incident management tickets is generated. In some examples, each linked pair of the first training set is labeled as being linked and comprises a first ticket having a first text feature and a second feature, and a second ticket having a first text feature and a second feature. In some examples, the ticket generator 114 generates the first training set of linked pairs. In various examples, the first training set of linked pairs may include the first ticket 302 and the second ticket 304, and/or the first ticket 202 and the second ticket 204.

At step 404, a Siamese neural network model is trained using the first text feature of the first ticket and the first text feature of the second ticket as inputs to an input layer of the Siamese neural network model. The input layer may be configured to generate first input embeddings for the first ticket and second input embeddings for the second ticket. For example, the input layer 310 may be configured to generate the embeddings 312 and 314.

At step 406, the Siamese neural network model may be trained using the first input embeddings, the second input embeddings, the second feature of the first ticket, and the second feature of the second ticket as inputs to an output layer of the Siamese neural network model. The output layer may be configured to generate first output embeddings for the first ticket (e.g., embeddings 332) and second output embeddings for the second ticket (e.g., embeddings 334).

At step 408, the Siamese neural network model may be trained using a contrastive loss function between the first output embeddings for the first ticket and the second output embeddings for the second ticket. As one example, the contrastive loss function may be:

$$\text{Loss} = \frac{1}{2}(Y * D) + \frac{1}{2}(1 - Y)\left(\max\left(0, \left(m - \sqrt{(D + eps)}\right)\right)^2\right)$$

where Y is a ground truth label (e.g., linked or unlinked), m is a margin (generally a value of 1), eps is a small positive real number, and D is a squared distance, such as a Euclidean distance. In this example, when Y=1, the Loss is ½*D, so that the distance is small for a small loss, but when Y=0, the Loss is ½ *max (0, (m−$\sqrt{(D+eps)}$))$^2$ and the distance is large for a small loss.

In some examples, the input layer of the Siamese neural network model is a long short-term memory model, the first text feature is a title of a corresponding ticket, and the output layer is a different model than the input layer. The Siamese neural network model may comprise an intermediate layer configured to condense the first input embeddings into first condensed embeddings and the second input embeddings into second condensed embeddings and training the Siamese neural network model may comprise training the output layer using the first condensed embeddings and the second condensed embeddings. The intermediate layer may be a first linear layer and the output layer may be a second linear layer.

The method 400 may further include generating a second training set of unlinked pairs of incident management tickets, where each unlinked pair of the second training set is labeled as being unlinked and comprises: a third ticket having a first text feature and a second feature, and a fourth ticket having a first text feature and a second feature. The method 400 may further include training the Siamese neural network model using the first text feature of the third ticket and the first text feature of the fourth ticket as inputs to the input layer of the Siamese neural network model, the input layer being configured to generate first input embeddings for the third ticket and second input embeddings for the fourth ticket; training the Siamese neural network model using the first input embeddings, the second input embeddings, the second feature of the third ticket, and the second feature of the fourth ticket as inputs to the output layer of the Siamese neural network model, the output layer being configured to generate first output embeddings for the third ticket and second output embeddings for the fourth ticket; and training the Siamese neural network model using a contrastive loss function between the first output embeddings for the third ticket and the second output embeddings for the fourth ticket.

In some aspects, generating the first training set of linked pairs further comprises loading a historical dataset of incident management tickets and generating the second training set of unlinked pairs further comprises dynamically generating the third ticket and the fourth ticket.

In some aspects, generating the first training set of linked pairs further comprises inserting links between the first ticket and a third ticket when the second ticket includes a link to the third ticket.

In some aspects, training the Siamese neural network model using the first text feature of the first ticket and the first text feature of the second ticket further comprises: tokenizing the first text feature of the first ticket and the second text feature of the second ticket; and converting the tokenized first text feature of the first ticket and the tokenized second text feature of the second ticket to respective integer indexes.

In some aspects, the first ticket and the second ticket are linked as one of duplicate tickets, responsible tickets, and/or related tickets.

Figure 5:
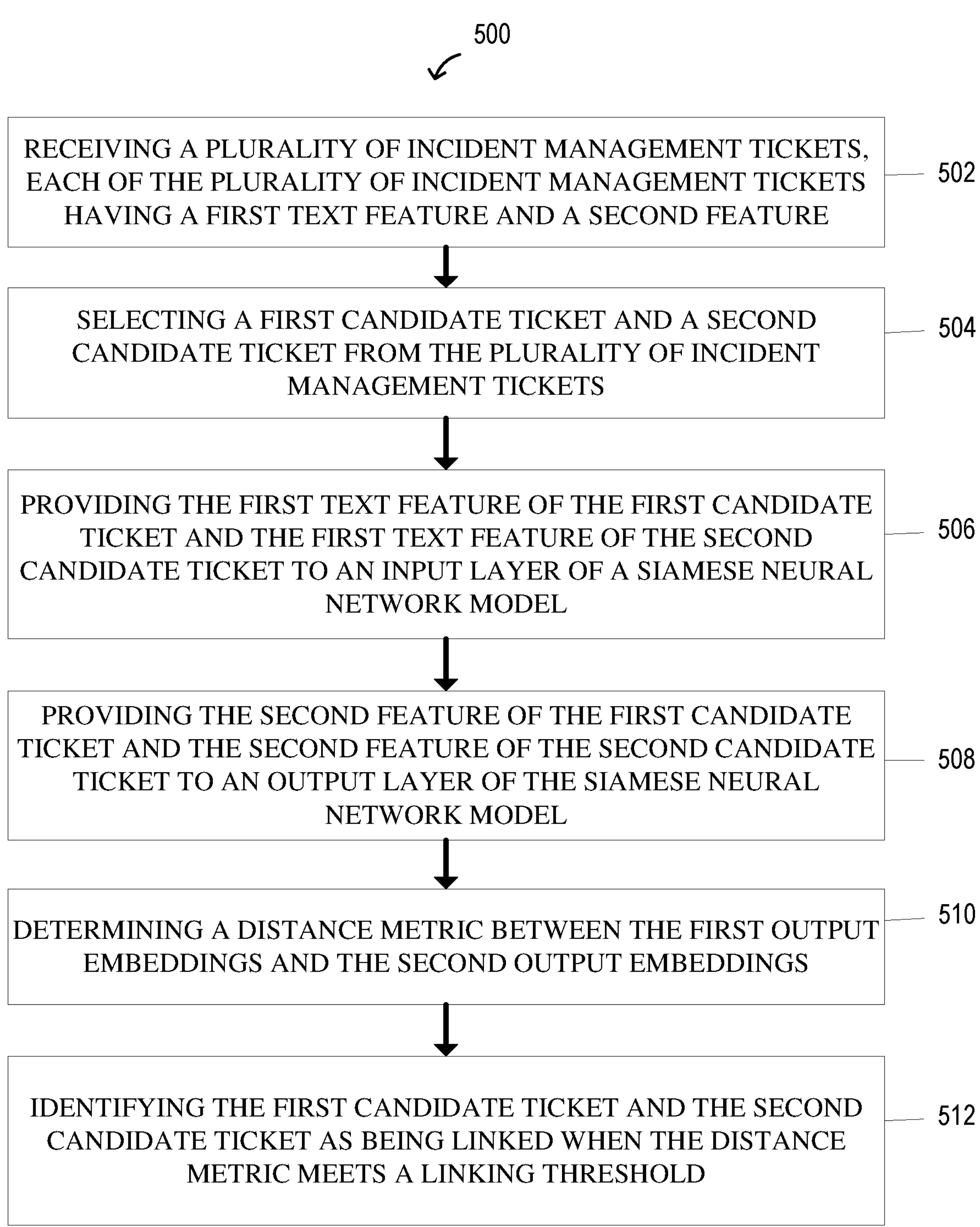
FIG. 5 shows a flowchart of an example method of generating link information.

FIG. 5 shows a flowchart of an example method 500 of generating link information, according to an example aspect. Technical processes shown in these figures will be performed automatically unless otherwise indicated. In any given example, some steps of a process may be repeated, perhaps with different parameters or data to operate on. Steps, in an aspect, may also be performed in a different order than the top-to-bottom order that is laid out in FIG. 5. Steps may be performed serially, in a partially overlapping manner, or fully in parallel. Thus, the order in which steps of method 500 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 5 may be performed by the computing device 110 (e.g., via the incident processor 112 and/or ticket generator 114), the server 120 (via the incident processor 122), or other suitable computing device.

Method 500 begins with step 502. At step 502, a plurality of incident management tickets are received, where each of the plurality of incident management tickets having a first text feature and a second feature.

At steps 504, 506, 508, 510, and 512, pairs of tickets within the plurality of incident management tickets that are linked are identified.

At step 504, a first candidate ticket and a second candidate ticket are selected from the plurality of incident management tickets. In some examples, each ticket from a first set of candidate tickets received within a real-time processing window is selected as the first candidate ticket for batch processing of the set of candidate tickets. The real-time processing window may be 15 minutes, 30 minutes, or another suitable window of time. Remaining tickets from the first set of candidate tickets received within the real-time processing window may be selected as the second candidate ticket for batch processing of the set of candidate tickets. In other examples, the second candidate ticket is selected from a second set of candidate tickets cached within a short-term processing window (e.g., 4 hours, 6 hours, etc.), wherein the short-term processing window is longer than the real-time processing window.

At step 506, the first text feature of the first candidate ticket and the first text feature of the second candidate ticket are provided to an input layer of a Siamese neural network model, the input layer being configured to generate first input embeddings for the first candidate ticket and second input embeddings for the second candidate ticket.

At step 508, the second feature of the first candidate ticket and the second feature of the second candidate ticket are provided to an output layer of the Siamese neural network model, the output layer being configured to generate first output embeddings for the first candidate ticket and second output embeddings for the second candidate ticket.

At step 510, a distance metric between the first output embeddings and the second output embeddings is determined. The distance metric is a Euclidean distance metric, in some examples.

At step 512, the first candidate ticket and the second candidate ticket are identified as being linked when the distance metric meets a linking threshold. In some examples, step 512 further includes generating link information that identifies a link between the first candidate ticket and the second candidate link when the distance metric meets the linking threshold.

In some aspects, selecting the first candidate ticket and the second candidate ticket from the plurality of incident management tickets further comprises selecting each ticket from a first set of candidate tickets received within a real-time processing window as the first candidate ticket for batch processing of the set of candidate tickets.

In some aspects, selecting the first candidate ticket and the second candidate ticket from the plurality of incident management tickets further comprises selecting remaining tickets from the first set of candidate tickets received within the real-time processing window as the second candidate ticket for batch processing of the set of candidate tickets.

In some aspects, selecting the first candidate ticket and the second candidate ticket from the plurality of incident management tickets further comprises selecting the second candidate ticket from a second set of candidate tickets cached within a short-term processing window, wherein the short-term processing window is longer than the real-time processing window.

In some aspects, the method 500 further comprises generating link information that identifies a link between the first candidate ticket and the second candidate link when the distance metric meets the linking threshold.

Figure 6:
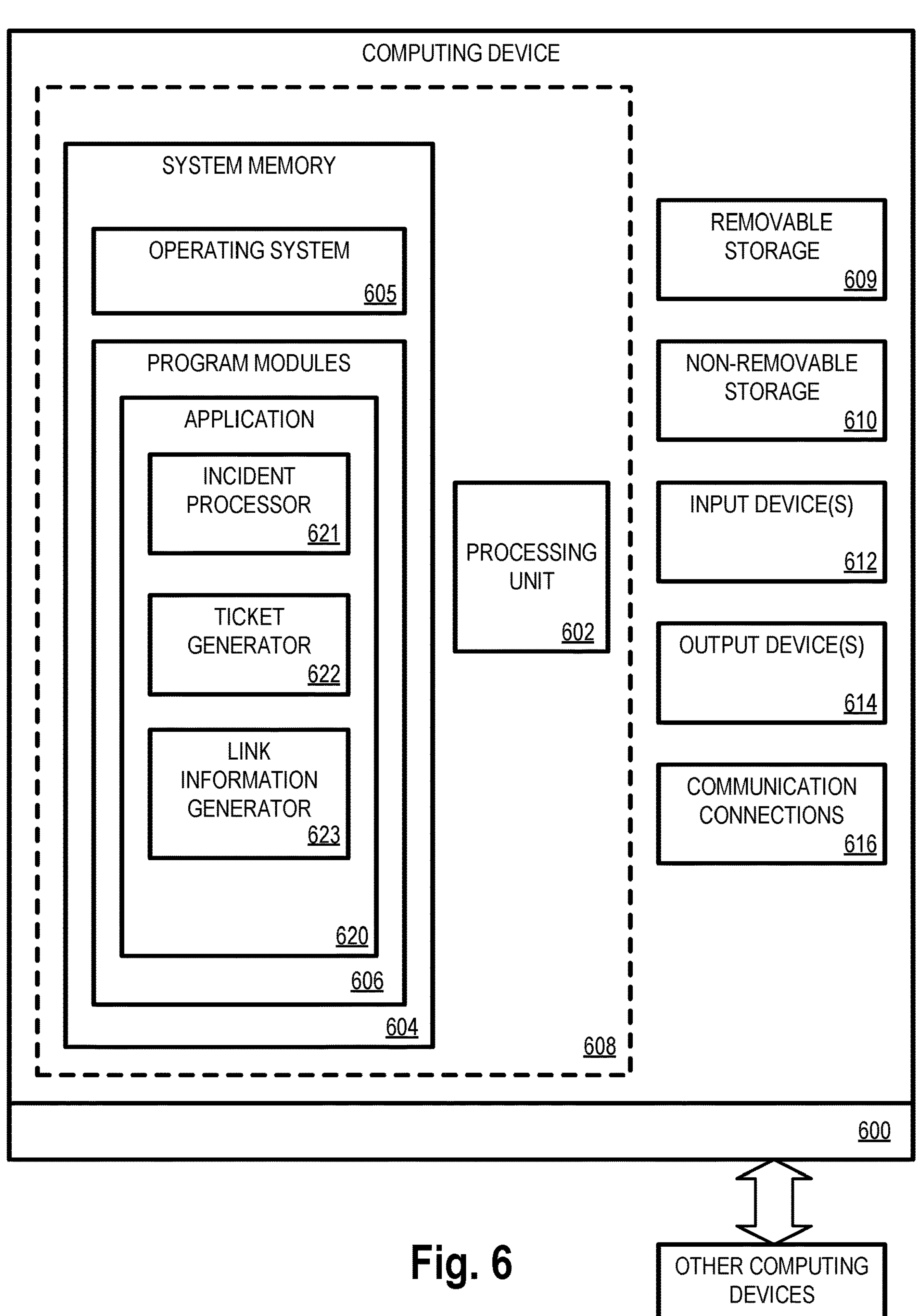
FIG. 6 is a block diagram illustrating example physical components of a computing device with which aspects of the disclosure may be practiced.
Figure 7:
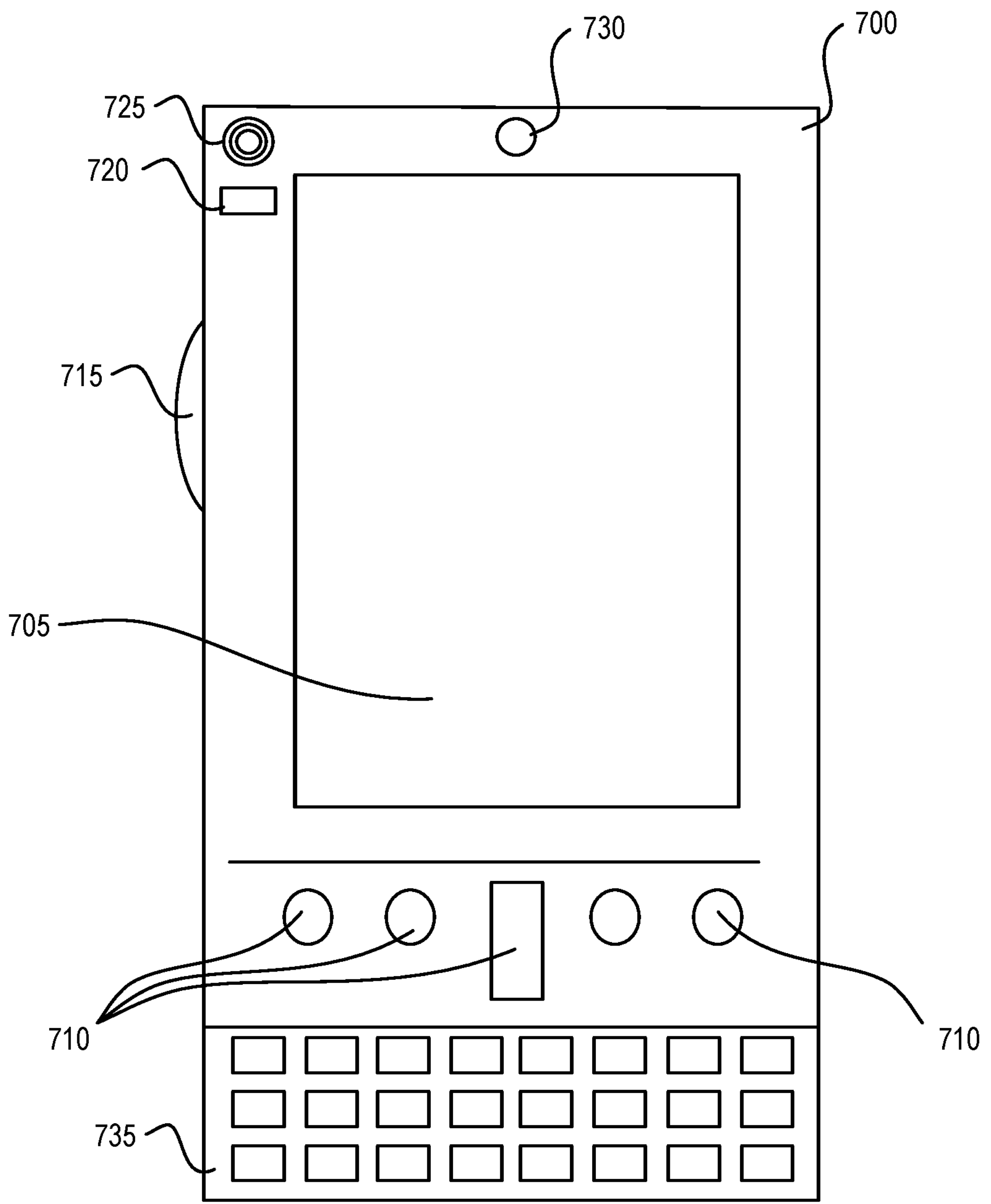
FIGS. 7 and 8 are simplified block diagrams of a mobile computing device with which aspects of the present disclosure may be practiced.
Figure 8:
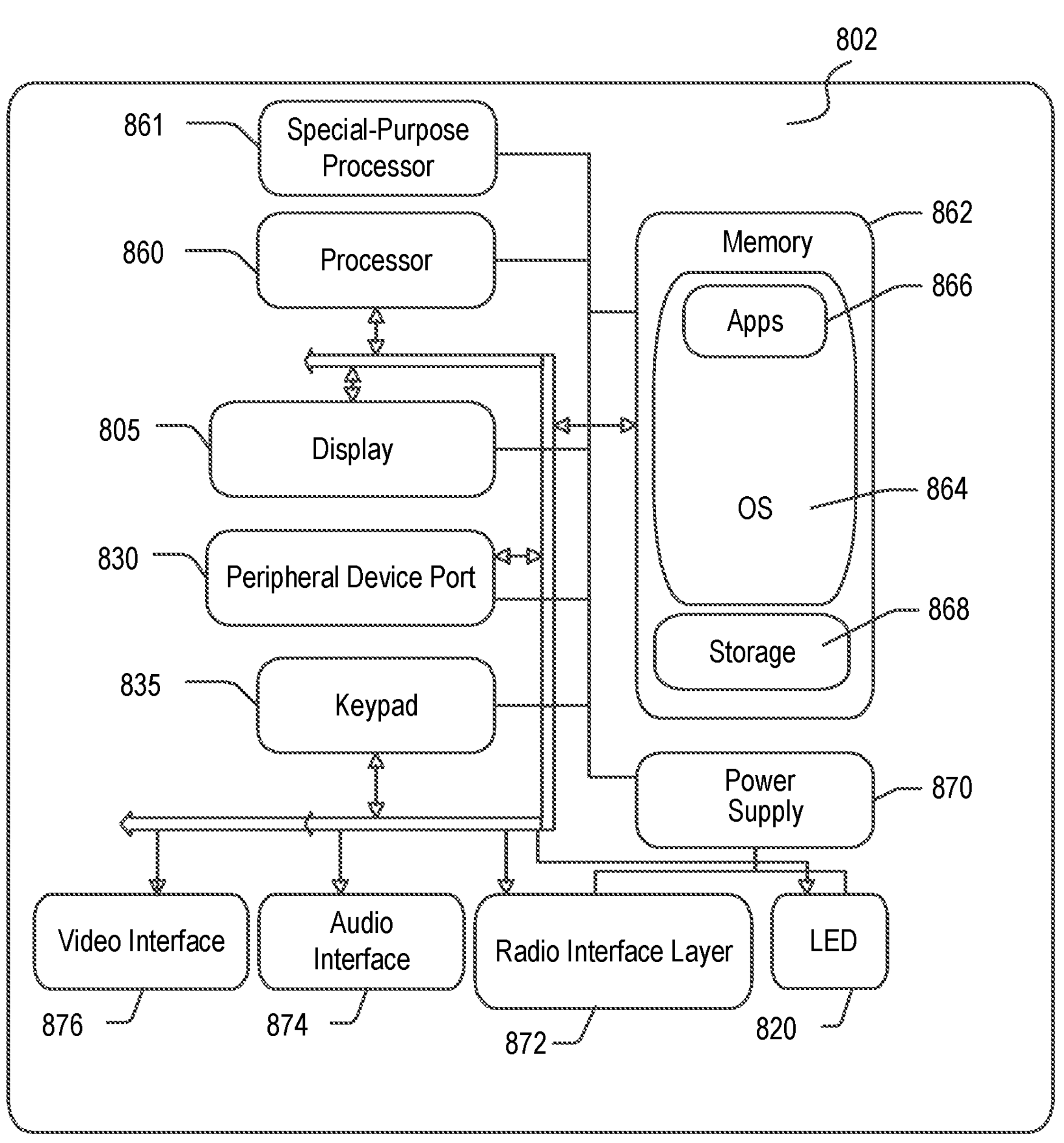

FIGS. 6, 7, and 8 and the associated descriptions provide a discussion of a variety of operating environments in which aspects of the disclosure may be practiced. However, the devices and systems illustrated and discussed with respect to FIGS. 6, 7, and 8 are for purposes of example and illustration and are not limiting of a vast number of computing device configurations that may be utilized for practicing aspects of the disclosure, as described herein.

FIG. 6 is a block diagram illustrating physical components (e.g., hardware) of a computing device 600 with which aspects of the disclosure may be practiced. The computing device components described below may have computer executable instructions for implementing an incident management linking application 620 on a computing device (e.g., computing device 110), including computer executable instructions for incident management linking application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running incident management linking application 620, such as one or more components with regard to FIGS. 1 and 2, and, in particular, incident processor 621 (e.g., corresponding to incident processor 112 or incident processor 122), ticket generator 622 (e.g., corresponding to ticket generator 114), and link information generator 623 (e.g., corresponding to link information generator 270).

The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., incident management linking application 620) may perform processes including, but not limited to, the aspects, as described herein. Other program modules that may be used in accordance with aspects of the present disclosure, and in particular for generating link information, may include incident processor 621 and ticket generator 622.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7 and 8 illustrate a mobile computing device 700, for example, a mobile telephone, a smart phone, wearable computer (such as a smart watch), a tablet computer, a laptop computer, and the like, with which aspects of the disclosure may be practiced. In some aspects, the client may be a mobile computing device. With reference to FIG. 7, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative example, the mobile computing device 700 is a portable phone system, such as a cellular phone. The mobile computing device 700 may include a front-facing camera 730. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 8 is a block diagram illustrating the architecture of one aspect of a mobile computing device. That is, the mobile computing device 700 can incorporate a system (e.g., an architecture) 802 to implement some aspects. In one aspect, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone. The system 802 may include a display 805 (analogous to display 705), such as a touch-screen display or other suitable user interface. The system 802 may also include an optional keypad 835 (analogous to keypad 735) and one or more peripheral device ports 830, such as input and/or output ports for audio, video, control signals, or other suitable signals.

The system 802 may include a processor 860 coupled to memory 862, in some examples. The system 802 may also include a special-purpose processor 861, such as a neural network processor. One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer.

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 725 (e.g., audio transducer 725 illustrated in FIG. 7). In the illustrated example, the visual indicator 820 is a light emitting diode (LED) and the audio transducer 725 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 725, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 700 implementing the system 802 may have additional features or functionality. For example, the mobile computing device 700 may also include additional data storage devices (removable and/or non-removable) such as, magnetic disks, optical disks, or tape. Such additional storage is illustrated in FIG. 8 by the non-volatile storage area 868.

Data/information generated or captured by the mobile computing device 700 and stored via the system 802 may be stored locally on the mobile computing device 700, as described above, or the data may be stored on any number of storage media that may be accessed by the device via the radio interface layer 872 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 7 and 8 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of training a neural network for linking incident management tickets, the method comprising:

generating a first training set of linked pairs of tickets for incident management, wherein each linked pair of the first training set is labeled as being linked and comprises:

a first ticket having a first text feature and a second feature, a second ticket having a first text feature and a second feature, and the first ticket representing a ticket that is responsible for the second ticket;

training a Siamese neural network model by using the first text feature of the first ticket and the first text feature of the second ticket as inputs to train an input layer of the Siamese neural network model, the input layer being configured to generate first input embeddings for the first ticket and second input embeddings for the second ticket, and the input layer representing a long short-term memory (LSTM) layer to embed a textual feature;

training the Siamese neural network model by using the first input embeddings, the second input embeddings, the second feature of the first ticket, and the second feature of the second ticket as inputs to train an output layer of the Siamese neural network model, the output layer being configured to generate first output embeddings for the first ticket and second output embeddings for the second ticket, and the output layer representing a linear layer; and training the Siamese neural network model by using a contrastive loss function between the first output embeddings for the first ticket and the second output embeddings for the second ticket.

2. The method of claim 1, wherein the input layer of the Siamese neural network model is a long short-term memory model, the first text feature is a title of a corresponding ticket, and the output layer is a different model than the input layer.

3. The method of claim 2, wherein the Siamese neural network model comprises an intermediate layer configured to condense the first input embeddings into first condensed embeddings and the second input embeddings into second condensed embeddings; and wherein training the Siamese neural network model using the first input embeddings, the second input embeddings, the second feature of the first ticket, and the second feature of the second ticket as inputs to the output layer comprises training the output layer using the first condensed embeddings and the second condensed embeddings.

4. The method of claim 3, wherein the intermediate layer is a first linear layer and the output layer is a second linear layer.

5. The method of claim 1, the method further comprising:

generating a second training set of unlinked pairs of tickets for incident management, wherein each unlinked pair of the second training set is labeled as being unlinked and comprises:

a third ticket having a first text feature and a second feature, a fourth ticket having a first text feature and a second feature, and the third ticket representing a ticket that is responsible for the fourth ticket;

training the Siamese neural network model by using the first text feature of the third ticket and the first text feature of the fourth ticket as inputs to train the input layer of the Siamese neural network model, the input layer being configured to generate first input embeddings for the third ticket and second input embeddings for the fourth ticket;

training the Siamese neural network model by using the first input embeddings, the second input embeddings, the second feature of the third ticket, and the second feature of the fourth ticket as inputs to train the output layer of the Siamese neural network model, the output layer being configured to generate first output embeddings for the third ticket and second output embeddings for the fourth ticket; and training the Siamese neural network model by using a contrastive loss function between the first output embeddings for the third ticket and the second output embeddings for the fourth ticket.

6. The method of claim 5, wherein generating the first training set of linked pairs further comprises loading a historical dataset of incident management tickets; and wherein generating the second training set of unlinked pairs further comprises dynamically generating the third ticket and the fourth ticket.

7. The method of claim 1, wherein generating the first training set of linked pairs further comprises inserting links between the first ticket and a third ticket when the second ticket includes a link to the third ticket.

8. The method of claim 1, wherein training the Siamese neural network model using the first text feature of the first ticket and the first text feature of the second ticket further comprises:

tokenizing the first text feature of the first ticket and the second feature of the second ticket; and converting the tokenized first text feature of the first ticket and the tokenized second feature of the second ticket to respective integer indexes.

9. The method of claim 1, wherein the first ticket and the second ticket are linked as one of duplicate tickets, responsible tickets, and/or related tickets.

10. A computer-implemented method of generating link information, the method comprising:

receiving a plurality of incident management tickets, each of the plurality of incident management tickets having a first text feature and a second feature;

identifying pairs of tickets within the plurality of incident management tickets that are linked, comprising:

selecting a first candidate ticket and a second candidate ticket from the plurality of incident management tickets, wherein the first candidate ticket is responsible for the second candidate ticket;

providing the first text feature of the first candidate ticket and the first text feature of the second candidate ticket to a previously trained input layer of a Siamese neural network model, the input layer being configured to generate first input embeddings for the first candidate ticket and second input embeddings for the second candidate ticket, and the input layer representing a long short-term memory (LSTM) layer to embed a textual feature;

providing the second feature of the first candidate ticket and the second feature of the second candidate ticket to a previously trained output layer of the Siamese neural network model, the output layer being configured to generate first output embeddings for the first candidate ticket and second output embeddings for the second candidate ticket, and the output layer representing a linear layer;

determining a distance metric between the first output embeddings and the second output embeddings; and identifying the first candidate ticket and the second candidate ticket as being linked when the distance metric meets a linking threshold.

11. The method of claim 10, wherein selecting the first candidate ticket and the second candidate ticket from the plurality of incident management tickets further comprises selecting each ticket from a first set of candidate tickets received within a real-time processing window as the first candidate ticket for batch processing of the first set of candidate tickets.

12. The method of claim 11, wherein selecting the first candidate ticket and the second candidate ticket from the plurality of incident management tickets further comprises selecting remaining tickets from the first set of candidate tickets received within the real-time processing window as the second candidate ticket for batch processing of the set of candidate tickets.

13. The method of claim 11, wherein selecting the first candidate ticket and the second candidate ticket from the plurality of incident management tickets further comprises selecting the second candidate ticket from a second set of candidate tickets cached within a short-term processing window, wherein the short-term processing window is longer than the real-time processing window.

14. The method of claim 10, the method further comprising generating link information that identifies a link between the first candidate ticket and the second candidate ticket when the distance metric meets the linking threshold.

15. A system for training a neural network for linking incident management tickets, the system comprising:

an incident processor configured to receive incident management tickets;

wherein the incident processor is configured to:

generate a first training set of linked pairs of incident management tickets, wherein each linked pair of the first training set is labeled as being linked and comprises:

a first ticket having a first text feature and a second feature, a second ticket having a first text feature and a second feature, and the first ticket representing a ticket that is responsible for the second ticket;

train a Siamese neural network model by using the first text feature of the first ticket and the first text feature of the second ticket as inputs to train an input layer of the Siamese neural network model, the input layer being configured to generate first input embeddings for the first ticket and second input embeddings for the second ticket, and the input layer representing a long short-term memory (LSTM) layer to embed a textual feature;

train the Siamese neural network model by using the first input embeddings, the second input embeddings, the second feature of the first ticket, and the second feature of the second ticket as inputs to train an output layer of the Siamese neural network model, the output layer being configured to generate first output embeddings for the first ticket and second output embeddings for the second ticket, and the output layer representing a linear layer; and train the Siamese neural network model by using a contrastive loss function between the first output embeddings for the first ticket and the second output embeddings for the second ticket.

16. The system of claim 15, wherein the input layer of the Siamese neural network model is a long short-term memory model, the first text feature is a title of a corresponding ticket, and the output layer is a different model than the input layer.

17. The system of claim 16, wherein the Siamese neural network model comprises an intermediate layer configured to condense the first input embeddings into first condensed embeddings and the second input embeddings into second condensed embeddings; and wherein training the Siamese neural network model by using the first input embeddings, the second input embeddings, the second feature of the first ticket, and the second feature of the second ticket as inputs to train the output layer comprises training the output layer using the first condensed embeddings and the second condensed embeddings.

18. The system of claim 17, wherein the intermediate layer is a first linear layer and the output layer is a second linear layer.

19. The system of claim 15, the incident processor further configured to:

generate a second training set of unlinked pairs of incident management tickets, wherein each unlinked pair of the second training set is labeled as being unlinked and comprises:

a third ticket having a first text feature and a second feature, a fourth ticket having a first text feature and a second feature, and the third ticket representing a ticket that is responsible for the fourth ticket;

train the Siamese neural network model by using the first text feature of the third ticket and the first text feature of the fourth ticket as inputs to train the input layer of the Siamese neural network model, the input layer being configured to generate first input embeddings for the third ticket and second input embeddings for the fourth ticket;

train the Siamese neural network model by using the first input embeddings, the second input embeddings, the second feature of the third ticket, and the second feature of the fourth ticket as inputs to train the output layer of the Siamese neural network model, the output layer being configured to generate first output embeddings for the third ticket and second output embeddings for the fourth ticket; and train the Siamese neural network model by using a contrastive loss function between the first output embeddings for the third ticket and the second output embeddings for the fourth ticket.

20. The system of claim 19, wherein generating the first training set of linked pairs further comprises loading a historical dataset of incident management tickets; and wherein generating the second training set of unlinked pairs comprises dynamically generating the third ticket and the fourth ticket.

* * * * *